United States Patent [19]
Tanaka

[11] Patent Number: 6,023,728
[45] Date of Patent: Feb. 8, 2000

[54] SYSTEM FOR USING RESERVATIONS TO TRANSMIT DATA BETWEEN PLURAL MICROCOMPUTER APPLICATION INSTRUMENTS IN A DATA TRANSMISSION SYSTEM

[75] Inventor: Mizue Tanaka, Kanagawa, Japan

[73] Assignee: NEC Corporation, Tokyo, Japan

[21] Appl. No.: 08/929,059

[22] Filed: Sep. 15, 1997

[30] Foreign Application Priority Data

Sep. 13, 1996 [JP] Japan ..................................... 8-243023

[51] Int. Cl.⁷ ............................ G06F 13/38; G06F 15/17
[52] U.S. Cl. .......................................... 709/225; 710/107
[58] Field of Search ..................................... 370/439, 443; 709/225, 237; 710/107, 113, 119, 125, 240

[56] References Cited

U.S. PATENT DOCUMENTS

| | | | |
|---|---|---|---|
| 4,998,244 | 3/1991 | Lee et al. ................................ | 370/85.1 |
| 5,172,373 | 12/1992 | Suzuki .................................. | 370/85.11 |
| 5,479,395 | 12/1995 | Goodman et al. ....................... | 370/16 |
| 5,615,212 | 3/1997 | Ruszczyk et al. ....................... | 370/433 |
| 5,706,464 | 1/1998 | Moore et al. ........................... | 395/449 |
| 5,835,714 | 11/1998 | Herzl et al. ........................ | 395/200.38 |

FOREIGN PATENT DOCUMENTS 4-163658 6/1992 Japan .
8-137807 5/1996 Japan .

*Primary Examiner*—Mark H. Rinehart
*Attorney, Agent, or Firm*—Foley & Lardner

[57] ABSTRACT

In a high level function complex system comprising a combination of a plurality of microcomputer application instruments, a data transmission system of each microcomputer application instrument includes a reservation status holder for setting and holding a communication reservation condition in response to a communication reservation request generated in one of the microcomputer application instruments. The reservation status holder also generates a communication reservation signal. The data transmission system further includes a statlis discriminator to detect whether a communication bus is in a communication start possible condition, and if so detected, to generate a communication start enable signal. A communication start instruction generator generates a communication start signal to instruct a communication start in response to the communication reservation signal and the communication start enable signal.

4 Claims, 4 Drawing Sheets

SYSTEM FOR USING RESERVATIONS TO TRANSMIT DATA BETWEEN PLURAL MICROCOMPUTER APPLICATION INSTRUMENTS IN A DATA TRANSMISSION SYSTEM

BACKGROUND OF THE INVENTION

1. Field of the invention

The present invention relates to a data transmission system, and more specifically to a data transmission system for transmitting data between a plurality of microcomputer application instruments.

2. Description of related art

Recently, with a high level function and a high level performance of microcomputer incorporating systems, namely, microcomputer application instruments, a function of a data communication between the instruments has become important, and in addition, there is a tendency that the amount of data communication is increasing. Furthermore, since the microcomputer application instrument itself can take an initiative position, namely, a master station function, in the data communication function, the data communication between the microcomputer application instruments inevitably involves a plurality of master stations. In this specification, the microcomputer application instrument will be called a "master unit", and the communication conducted by the master unit will be called a "master communication".

With a spreading of a high level function complex system constituted of a combination of a plurality of microcomputer application instruments as mentioned above, it is estimated that there frequently occurs a contention among requests for the communication between the master units. Accordingly, a period in which the master unit can surely initiate joining in the communication, namely, a joining enable period, is restricted to a very short period.

FIG. 1A is a flow chart illustrating a communicating procedure of each master unit in a prior art complex system including a plurality of master units. FIG. 1B is a time chart illustrating a communication sequence in the prior art complex system including a plurality of master units. Now, a communicating procedure performed in each master unit will be described with reference to FIGS. 1A and 1B. First, in a step P1, each master unit monitors the condition of the communication bus, and discriminates whether or not communication on the communication bus by another master has ended, namely, whether or not the communication bus is in a communication start possible condition. If the communication start is not allowable, the master unit performs a polling until the communication bus becomes the communication start possible condition.

When the communication bus is in the communication start possible condition, the master unit is then required to ceaselessly detect, under a program instruction, whether or not the master unit itself is in a communication ready condition (step P2). As a result, another processing cannot be executed in the master unit during a period in which the master unit ceaselessly detects whether or not the master unit itself is in the communication ready condition. If it is detected in the step P2 that it is in the communication ready condition, the master unit dispatches a request for the master communication, namely, performs an entry for a master communication start (step P3). If the master communication is actually possible, the master unit actually starts the master communication (step P4).

Incidentally, a mainer for discriminating the communication ready condition by an interrupt will be described. When the communication bus becomes the communication start possible condition, an interrupt is generated, and in an interrupt processing, the entry for the master communication start is conducted if necessary. If the master communication is in the ready condition, the master communication is started.

However, there often occurs a case that after the moment a first master unit has discriminated that the communication bus is in the communication start possible condition but before the first master unit actually starts the master communication (namely, in a period from the step P1 to the step P4), a second master unit starts its master communication. In this case, the first master unit cannot perform the entry for the master communication start, and therefore, cannot actually start the master communication. If the first master unit actually starts the master communication, it disturbs the master communication executed by the second master unit.

In the prior art system constituted of a combination of a plurality of microcomputer application instruments, the number of the master units is two or three at the most in ordinary cases and never reaches ten. Accordingly, since the frequency of the above mentioned case is not so high in an actual communication situation, even if a first attempt of the master communication fails, if the attempt of the entry for the master communication is repeated, the master communication can finally become successful. However, in the recent high level function complex system including a number of master units, the data communication is performed among a number of master units at a very high frequency, and there is occurs a situation that even if the master communication is always requested, the master communication cannot be actually executed

SUMMARY OF THE INVENTION

Accordingly, it is an object of the present invention to provide a data transmission system which has overcome the above mentioned defect of the conventional one.

Another object of the present invention is to provide a data transmission system capable of ensuring each master unit to be able to surely execute the master communication in a high level function complex system including a number of master units.

The above and other objects of the present invention are achieved in accordance with the present invention by a data transmission system for use in a microcomputer application instrument, for communication through a communication bus among a plurality of microcomputer application instruments, the data transmission system including a reservation status hold means for setting and holding a communication reservation condition in response to a communication reservation request generated in the microcomputer application instrument itself, and for generating a communication reservation signal, a status discriminating means for detecting that the communication bus is in a communication start possible condition, to generate a communication start enable signal, and a communication start instruction generating means responding to the communication reservation signal and the communication start enable signal to generate a communication start signal instructing a communication start.

The above and other objects, features and advantages of the present invention will be apparent from the following description of preferred embodiments of the invention with reference to the accompanying drawings.

DESCRIPTION OF THE PERFERRED EMBODIMENTS

Figure 2:
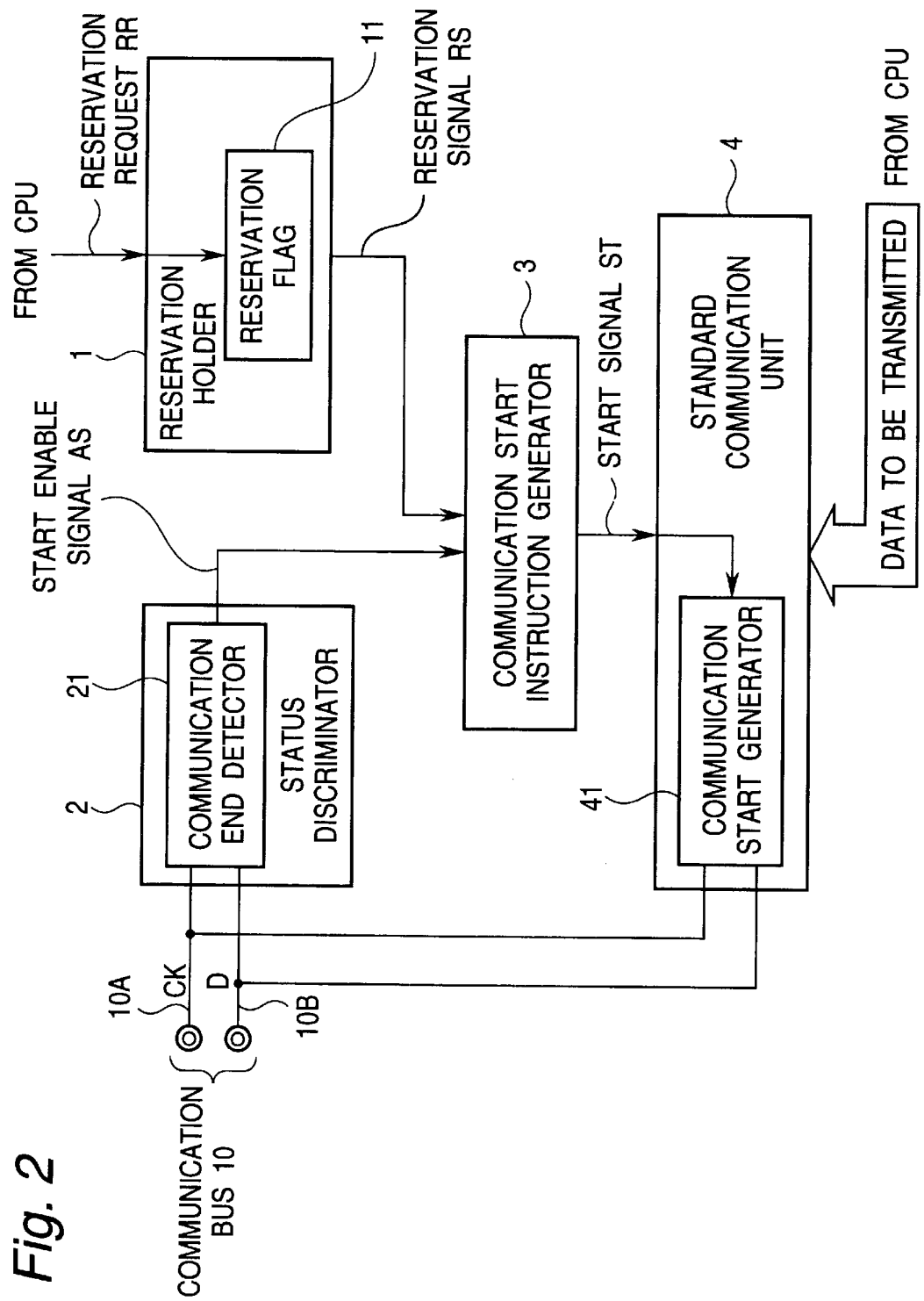
FIG. 2 is a block diagram of a first embodiment of the data transmission system in accordance with the present invention.

Referring to FIG. 2, there is shown a block diagram of a first embodiment of the data transmission system in accordance with the present invention.

Figure 1A:
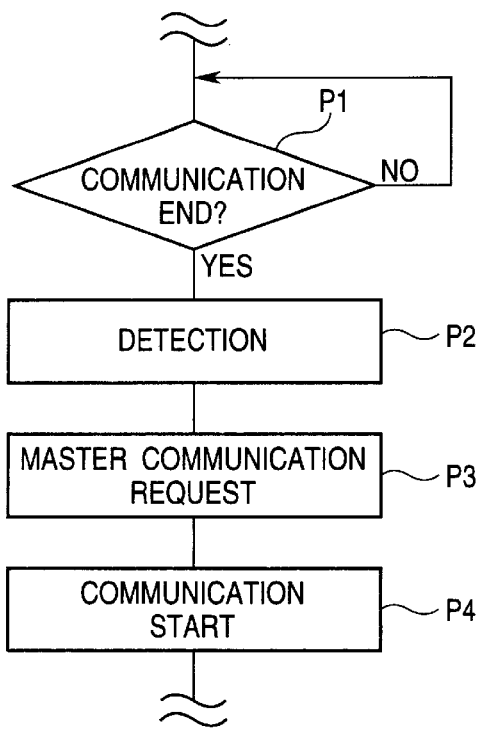
FIG. 1A is a flow chart illustrating a communicating procedure in a prior art complex system including a plurality of master units.
Figure 1B:
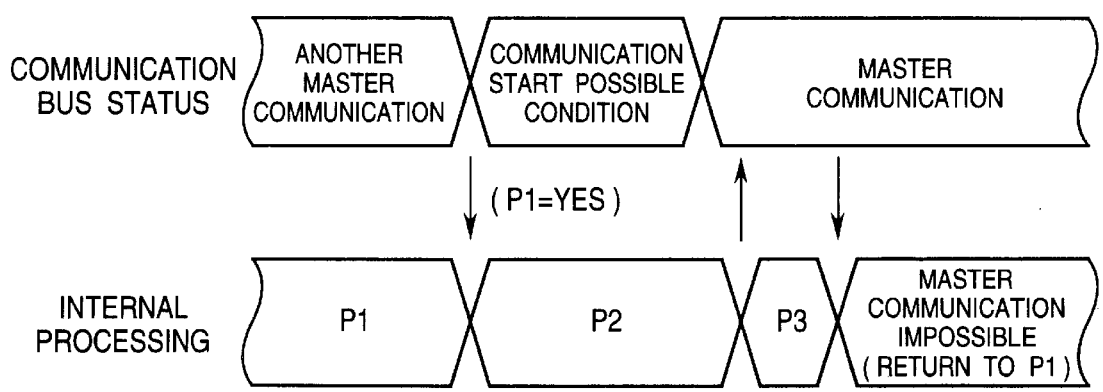
FIG. 1B is a time chart illustrating a communication sequence in the prior art complex system including a plurality of master units.

The data transmission system shown in FIG. 1 is included in a peripheral circuit (not shown) of a microcomputer (not shown) of a microcomputer application instrument, and comprises a reservation status holder 1 including a reservation flag 11, which is set into a communication reservation condition in response to a communication reservation request instruction RR generated in a CPU (central processing unit) (not shown) of the microcomputer (not shown). When the reservation flag 11 is set into the communication reservation condition, the reservation flag 11 generates a communication reservation signal RS.

The shown data transmission system also comprises a status discriminator 2 including a communication end detector 21 connected to a clock line 10A and a data line 10B of a communication bus 10 for monitoring a clock signal CK and a data signal D on the communication bus for the purpose of detecting a communication end condition of the communication bus. When the communication end detector 21 detects the communication end condition, the communication end detector 21 generates a communication start enable signal AS.

The shown data transmission system further comprises a communication start instruction generator 3 responding to the communication reservation signal RS and the communication start enable signal AS to generate a communication start signal ST instructing a communication start when both of the communication reservation signal RS and the communication start enable signal AS are active.

The communication start signal ST is supplied to a communication start generator 41 included in a standard communication unit 4 which is provided as a standard function in the peripheral circuit (not shown) of the microcomputer (not shown). If the communication start generator 41 receives an active communication start signal ST, the communication start generator 41 executes a communication start processing for generating a communication start condition on the communication bus at a predetermined timing.

Figure 3A:
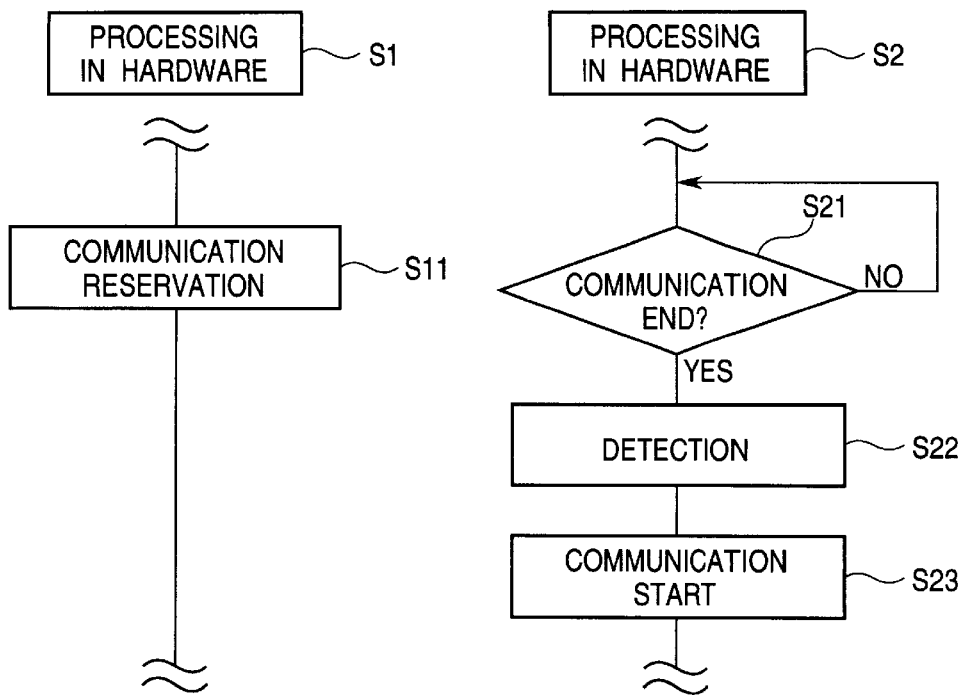
FIG. 3A is a flow char illustrating a communicating procedure in the data transmission system in accordance with the present invention shown in FIG. 2.
Figure 3B:
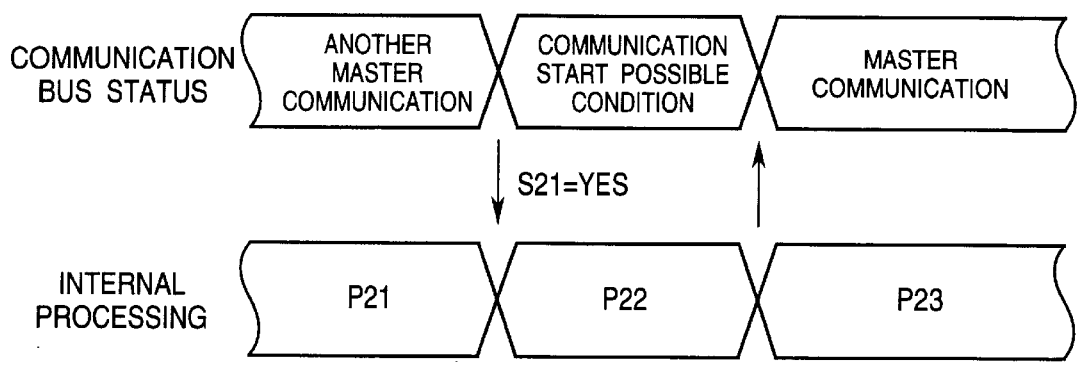
FIG. 3B is a time chart illustrating a communication sequence in the data transmission system in accordance with the present invention shown in FIG. 2.

Now, an operation of the data transmission system shown in FIG. 2 will be described with reference to FIGS. 3A and 3B. FIG. 3A is a flow chart illustrating a communicating procedure in the data transmission system shown in FIG. 2. FIG. 3B is a time chart illustrating a communication sequence in the data transmission system shown in FIG. 2.

The operation of the data transmission system is constituted of a processing step S1 executed in software and a processing step S2 executed in hardware. First, in the software step S1, in response to the communication reservation request instruction RR generated in the CPU (not shown) of the microcomputer (not shown), the reservation flag 11 of the reservation status holder 1 is set to generate the communication reservation signal RS (step S11). While the reservation flag 11 is in the set condition, the data transmission system holds the communication reservation condition.

On the other hand, in the hardware step S2, the communication end detector 21 of the status discriminator 2 ceaselessly monitors the status of the clock line CK and the data line D of the communication bus, to discriminate whether or not communication on the communication bus has been ended, namely, whether or not the communication bus is in the communication start possible condition (step S21). If the communication bus is in the communication start possible condition, the communication end detector 21 activates the communication start enable signal AS.

In response to the active communication reservation signal RS and the active communication start enable signal AS which exist concurrently, the communication start instruction generator 3 generates the active communication start signal ST to the standard communication unit 4 (step S22)

In response to the active communication start signal ST, the communication start generator 41 of the standard communication unit 4 generates the communication start condition on the communication bus at a predetermined timing (Step S23). Succeedingly, the communication unit 4 starts to transmit "data to be transmitted" supplied from the CPU (not shown) of the microcomputer (not shown), onto the communication bus in a conventional manner. On the other hand, the reservation flag 11 is reset in a software manner by the microcomputer (not shown).

Figure 4:
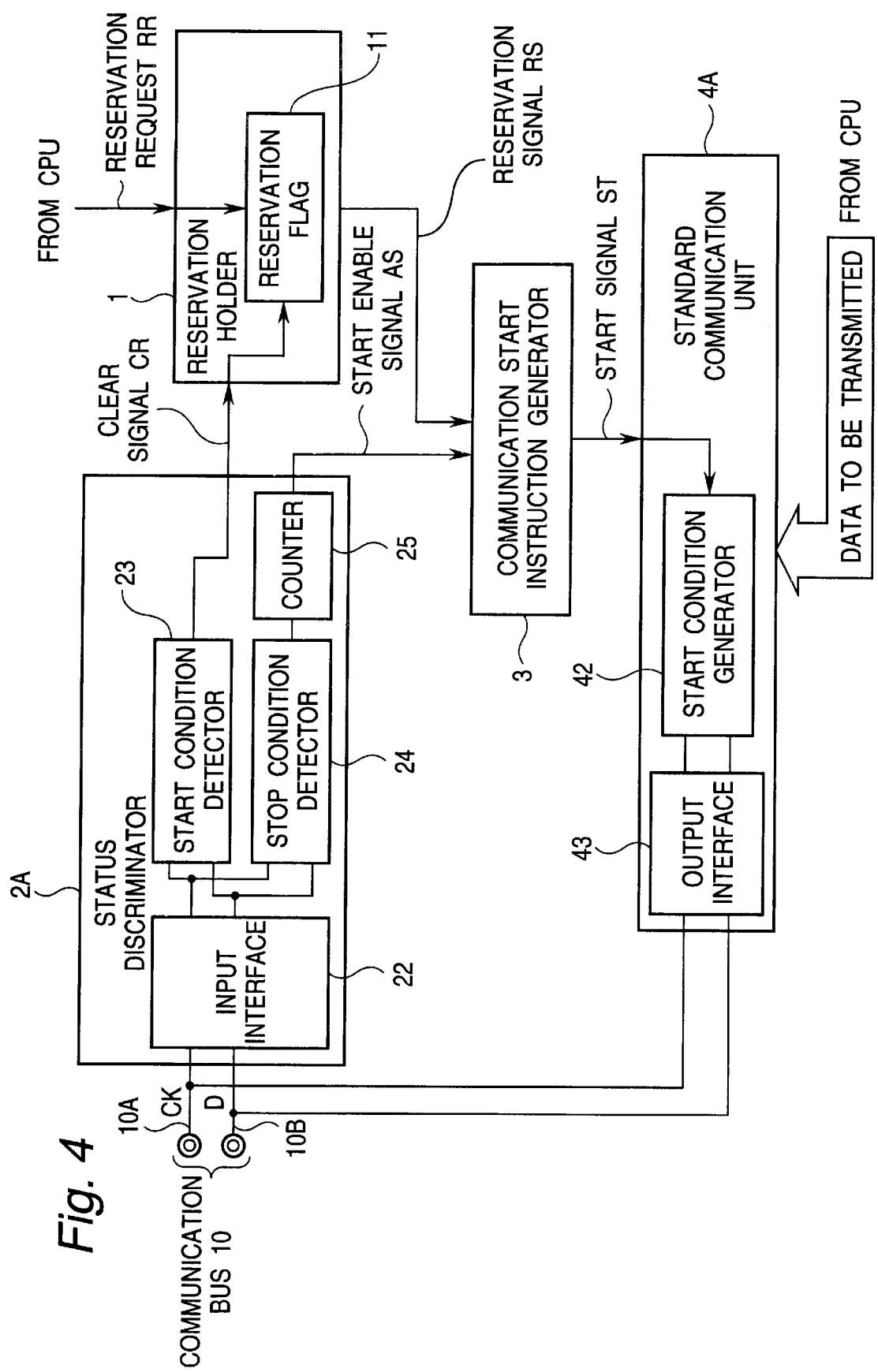
FIG. 4 is a block diagram of a second embodiment of the data transmission system in accordance with the present invention.

Now, a second embodiment of the data transmission system in accordance with the present invention will be described with reference to FIG. 4, which is a block diagram of the second embodiment of the data transmission system in accordance with the present invention. In FIG. 4, elements similar to those shown in FIG. 2 are given the same Reference Numerals, and explanation thereof will be omitted for simplification of description.

The second embodiment is characterized by comprising, in place of the status discriminator 2 and the standard communication unit 4, a status, discriminator 2A and a standard communication unit 4A which are adapted to the protocol for the $I^2C$ bus, which is a typical communication bus for a serial data transfer. In brief, under the $I^2C$ protocol, the communication is performed by sending a start condition, an address, data to be transmitted, and a stop condition, in the named order. The start condition is featured by changing the data signal D from "1" to "0" while maintaining the clock signal CK at "1", and the stop condition is featured by changing the data signal D from "0" to "1" while maintaining the clock signal CK at "1". In addition, the start condition can be said to correspond to the entry for the master communication.

The status discriminator 2A includes an input interface 22 connected to the clock line 10A and the data line 10B of the communication bus 10 to receive a clock signal CK and a data signal D on the communication bus, a start condition detector 23 receiving the clock signal CK and the data signal D through the input interface 22, for detecting a start condition on the basis of respective conditions of the clock signal CK and the data signal D, a stop condition detector 24 receiving the clock signal CK and the data signal D through the input interface 22, for detecting a stop condition on the basis of the respective conditions of the clock signal CK and the data signal D, and a counter 25 connected to the stop condition detector 24 to count a bus-free time from the moment the stop condition is detected by the stop condition detector 24, for generating a communication start enable signal AS after a predetermined length of bus-free time has elapsed On the other hand, the standard communication unit 4A includes a start condition generator 42 for generating a start condition in response to the communication start signal ST, and an output interface 43 connected between the communication bus and the start condition generator 42.

Now, an operation of the second embodiment will be described with reference to FIG. 4.

Similarly to the first embodiment, the reservation flag 11 in the reservation holder 1 is set in response to the reservation request instruction RR, to generate the reservation signal RS. The start condition detector 23 receiving the clock signal CK and the data signal D through the input interface 22, detects, as the start condition, the transition from "1" to "0" of the data signal D when the clock signal CK is maintained at "1", and generates a reservation flag clear signal CR, which is supplied to the reservation flag 11 to clear the reservation flag 11. On the other hand, the stop condition detector 24 receiving the clock signal CK and the data signal D through the input interface 22, detects, as the stop condition, the transition from "0" to "1" of the data signal D when the clock signal CK is "1". From the moment the stop condition is detected by the stop condition detector 24, the counter 25 starts to count a bus-free time, and generates the communication start enable signal AS after the predetermined length of bus-free time has elapsed from the moment the stop condition is detected by the stop condition detector 24.

In response to the active communication reservation signal RS and the active communication start enable signal AS which exist concurrently, the communication start instruction generator 3 generates the active communication start signal ST to the communication start condition generator 42 of the standard communication unit 4A.

In response to the active communication start signal ST, the communication start condition generator 42 sets the clock signal CK to "1", through the output interface 43, and further, changes the data signal D from "1" to "0" during a period in which the clock signal CK is maintained at "1", thereby to generate the start condition on the communication bus. Succeedingly, the communication unit 4A starts to transmit "data to be transmitted" supplied from the CPU (not shown) of the microcomputer (not shown), through the output interface 43 onto the communication bus 10 in a conventional manner. On the other hand, since the start condition is detected by the start condition detector 23 as mentioned above, the reservation flag 11 is reset by the clear signal CR generated by the start condition detector 23.

The above mentioned second embodiment is realized in a communication system based on the I²C protocol. However, the present invention is not limited to the communication system based on the I²C protocol, but can be applied to other communication systems.

As seen from the above, the data transmission system in accordance with the present invention comprises a reservation status hold means for setting and holding a communication reservation condition in response to a communication reservation request, and for generating a communication reservation signal, a status discriminating means for detecting that the communication bus is in a communication start possible condition, to generate a communication start enable signal, and a communication start instruction generating means responding to the communication reservation signal and the communication start enable signal to generate a communication start signal. Therefore, as soon as the communication bus is put into the communication start possible condition because of completion of another communication by another master unit, the data transmission system can immediately perform an entry for a master communication. Accordingly, it is possible to eliminate a cause of difficulty in entering the master communication, which is attributable to the communication start processing time (steps S1 to S4) after the communication end on the communication bus is detected. As a result, the master communication can be surely executed.

The invention has thus been shown and described with reference to the specific embodiments. However, it should be noted that the present invention is in no way limited to the details of the illustrated structures but changes and modifications may be made within the scope of the appended claims.

I claim:

1. A data transmission system for use in a microcomputer application instrument for communication through a communication bus among a plurality of microcomputer application instruments, the data transmission system comprising:

a reservation status hold means for setting and holding a communication reservation condition in response to a communication reservation request generated in one of the microcomputer application instruments and for generating a communication reservation signal;

a status discriminating means for detecting that the communication bus is in a communication start possible condition and for generating a communication start enable signal; and a communication start instruction generating means for generating a communication start signal, which instructs said one of the microcomputer application instruments to start communicating, in response to the communication reservation signal and the communication start enable signal, wherein said reservation status hold means includes a reservation flag set in response to said communication reservation request for generating said communication reservation signal.

2. A data transmission system claimed in claim 1 wherein said status discriminating means includes a communication end detector monitoring a clock signal and a data signal on the communication bus to detect a communication end condition on the communication bus and to generate said communication start enable signal when said communication end condition is detected.

3. A data transmission system claimed in claim 1 wherein said status discriminating means includes a communication start detector monitoring a clock signal and a data signal on the communication bus to detect a communication start condition on the communication bus and to generate a communication reservation clear signal when said communication start condition is detected.

4. A data transmission system claimed in claim 1 further comprising a standard communication unit having a communication start generator responding to said communication start signal to execute a communication start processing for generating a communication start condition on the communication bus.

* * * * *